United States Patent
Hashimoto et al.

(10) Patent No.: US 8,330,906 B2
(45) Date of Patent: Dec. 11, 2012

(54) LIQUID CRYSTAL DISPLAY DEVICE

(75) Inventors: Yoshito Hashimoto, Osaka (JP); Hiroyuki Ohgami, Osaka (JP); Masayuki Soga, Osaka (JP); Masakazu Shibasaki, Osaka (JP); Masumi Kubo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 239 days.

(21) Appl. No.: 12/989,570

(22) PCT Filed: Mar. 30, 2009

(86) PCT No.: PCT/JP2009/001450
§ 371 (c)(1),
(2), (4) Date: Oct. 25, 2010

(87) PCT Pub. No.: WO2009/130851
PCT Pub. Date: Oct. 29, 2009

(65) Prior Publication Data
US 2011/0102713 A1 May 5, 2011

(30) Foreign Application Priority Data

Apr. 25, 2008 (JP) ................................. 2008-115192

(51) Int. Cl.
*G02F 1/1333* (2006.01)
*G02F 1/1337* (2006.01)

(52) U.S. Cl. ..................... 349/110; 349/129; 349/130

(58) Field of Classification Search ............. 349/129, 349/130, 110, 111, 99, 123, 141, 38, 139, 349/96, 117, 135
See application file for complete search history.

(56) References Cited

U.S. PATENT DOCUMENTS

| | | | |
|---|---|---|---|
| 5,032,009 A | 7/1991 | Gibbons et al. | |
| 5,447,662 A | 9/1995 | Herr et al. | |
| 6,407,791 B1 * | 6/2002 | Suzuki et al. | 349/129 |
| 6,661,488 B1 | 12/2003 | Takeda et al. | |
| 6,977,704 B2 | 12/2005 | Kataoka | |
| 7,113,241 B2 | 9/2006 | Hanaoka | |
| 2004/0041963 A1 | 3/2004 | Ogishima et al. | |
| 2006/0055858 A1 | 3/2006 | Nakanishi et al. | |
| 2009/0284703 A1 | 11/2009 | Shoraku et al. | |

OTHER PUBLICATIONS

International Search Report for PCT/JP2009/001450, mailed May 12, 2009.
English translation of International Preliminary Report on Patentability Chapter (I), dated Dec. 23, 2010.

\* cited by examiner

*Primary Examiner* — Thoi Duong
(74) *Attorney, Agent, or Firm* — Nixon & Vanderhye, P.C.

(57) ABSTRACT

The present invention provides a multi-domain type liquid crystal display device with a vertical alignment liquid crystal layer that can get a display operation done without making the viewer sense any unnaturalness and with the decrease in optical transmittance minimized. In the liquid crystal display device of this invention, the liquid crystal layer of each pixel has liquid crystal regions in which liquid crystal molecules tilt in multiple different directions when a voltage is applied between first and second electrodes. Each pixel has an opaque portion arranged on a boundary between the liquid crystal regions. The opaque portion is provided for at least one of the substrates so that when a voltage is applied between the first and second electrodes, the liquid crystal molecules neighboring the boundary will tilt while turning one of their end portions, which is closer to the substrate with the opaque portion, away from the boundary. The opaque portion includes a first shielding layer and a second shielding layer, which overlaps with the first shielding layer with a predetermined gap left between them.

6 Claims, 13 Drawing Sheets

| (a) | (b) | (c) |
|---|---|---|
| WITH NO OPAQUE PORTIONS | SINGLE-LAYER OPAQUE PORTION | MULTI(DUAL)-LAYER OPAQUE PORTION |

(a) WITH NO OPAQUE PORTIONS    (b) SINGLE-LAYER OPAQUE PORTION    (c) MULTI(DUAL)-LAYER OPAQUE PORTION (a)

(1) : WITH NO OPAQUE PORTIONS (b)

(2) : WITH ONE SHIELDING LAYER WITH A WIDTH OF 1.5 $\mu$m (c)

(3) : WITH ONE SHIELDING LAYER WITH A WIDTH OF 3.0 $\mu$m (d)

(4) : WITH TWO SHIELDING LAYERS WITH A WIDTH OF 1.5 $\mu$m EACH (a)

(b)

LIQUID CRYSTAL DISPLAY DEVICE

This application is the U.S. national phase of International Application No. PCT/JP2009/001450, filed 30 Mar. 2009, which designated the U.S. and claims priority to Japanese Application No. 2008-115192, filed 25 Apr. 2008, the entire contents of each of which are hereby incorporated by reference.

TECHNICAL FIELD

The present invention relates to a liquid crystal display device and more particularly relates to a multi-domain type LCD with a vertical alignment liquid crystal layer.

BACKGROUND ART

Recently, a thin and lightweight LCD is often used as the display of a personal computer or the monitor screen of a mobile telecommunications device. However, conventional TN (twisted nematic) mode and STN (super twisted nematic) mode LCDs allow only a narrow viewing angle. To overcome that problem, various techniques have been researched and developed so far.

A multi-domain type LCD with a vertical alignment liquid crystal layer is known as one of those LCDs with improved viewing angle characteristics. Such LCDs are usually called "VA (vertical alignment) mode LCDs". Patent Document No. 1 discloses an MVA (multi-domain vertical alignment) mode LCD, which is one of those various VA mode LCDs. In the MVA mode LCD, an orientation control structure for controlling the orientation of liquid crystal molecules is provided for each of the two substrates that face each other with a liquid crystal layer interposed between them. Specifically, the orientation control structure may be either a projection made of a dielectric material or a slit that has been cut through an electrode. With such an orientation control structure such as a projection or a slit, when a voltage is applied to the liquid crystal layer, a number of regions in which liquid crystal molecules tilt in mutually different directions (which are usually called "liquid crystal domains") are produced, thus lightening the azimuth angle dependence of the display characteristic and improving the viewing angle characteristic.

As described above, a VA mode LCD will contribute to getting a quality display operation done with a wide viewing angle. Recently, however, more and more attention has been paid to the fact that the γ characteristic will vary according to the viewing angle (i.e., whether the viewer is viewing the screen straight or obliquely). In other words, a lot of people are now aware that the γ characteristic has viewing angle dependence. The γ characteristic is the grayscale dependence of a display luminance. That is why if the γ characteristic in a front viewing direction is different from the one in an oblique viewing direction, then the grayscale will be displayed differently according to the viewing direction. Consequently, the viewer may sometimes find the image on the screen unnatural depending on the viewing direction.

Thus, to overcome such a problem, Patent Document No. 2 discloses a technique for arranging an opaque layer in a predetermined region within each pixel. That opaque layer selectively shields some of the multiple liquid crystal domains that will produce such an unnatural image from the light when the viewer is viewing obliquely, thereby minimizing such unnaturalness on the screen.

Patent Document No. 1: Japanese Patent Application Laid-Open Publication No. 11-242225

Patent Document No. 2: Japanese Patent Application Laid-Open Publication No. 2004-93846

DISCLOSURE OF INVENTION

Problems to be Solved by the Invention

If the opaque layer such as what is disclosed by Patent Document No. 2 were provided, however, the optical transmittance would also decrease even when the viewer is viewing straight. This is because the opaque layer that partially covers each pixel will also shield the pixel selectively even when the viewer is located right in front of the screen. To minimize such unnaturalness on the screen sufficiently, the opaque layer should have some broad width. That is why the optical transmittance in the front viewing direction would also decrease inevitably to a certain degree.

It is therefore an object of the present invention to provide a multi-domain type liquid crystal display device with a vertical alignment liquid crystal layer that can get a display operation done without making the viewer sense any such unnaturalness and with the decrease in optical transmittance minimized.

Means for Solving the Problems

A liquid crystal display device according to the present invention includes a first substrate, a second substrate, and a vertical alignment liquid crystal layer interposed between the first and second substrates. The device has a number of pixels, each of which includes a first electrode that is arranged on the first substrate to face the liquid crystal layer, a second electrode that is arranged on the second substrate to face the liquid crystal layer, and the liquid crystal layer arranged between the first and second electrodes. A part of the liquid crystal layer located within each pixel has multiple liquid crystal regions in which liquid crystal molecules tilt in multiple different directions when a voltage is applied between the first and second electrodes. Each pixel has an opaque portion that is arranged on a boundary between the multiple liquid crystal regions. The opaque portion is provided for at least one of the first and second substrates so that when a voltage is applied between the first and second electrodes, the liquid crystal molecules neighboring the boundary will tilt while turning one of their end portions, which is located closer to the substrate with the opaque portion, away from the boundary. The opaque portion includes a first shielding layer and a second shielding layer, which overlaps with the first shielding layer with a predetermined gap left between them.

Another liquid crystal display device according to the present invention also includes a first substrate, a second substrate, and a vertical alignment liquid crystal layer interposed between the first and second substrates. The device has a number of pixels, each of which includes a first electrode that is arranged on the first substrate to face the liquid crystal layer, a second electrode that is arranged on the second substrate to face the liquid crystal layer, and the liquid crystal layer arranged between the first and second electrodes. A part of the liquid crystal layer located within each pixel has multiple liquid crystal regions in which liquid crystal molecules tilt in multiple different directions when a voltage is applied between the first and second electrodes. The liquid crystal regions include a first liquid crystal region in which a retardation value, calculated based on incoming light that has been incident on the liquid crystal layer obliquely with respect to a normal to the display screen, increases as the applied voltage rises, and a second liquid crystal region in which the retardation value once decreases and then increases. Each pixel has an opaque portion that is provided for at least one of the first and second substrates and that selectively shields the first liquid crystal region from the incoming light when a viewer is viewing obliquely with respect to the normal to the display screen. The opaque portion includes a first shielding layer and a second shielding layer, which overlaps with the first shielding layer with a predetermined gap left between them.

In one preferred embodiment, the liquid crystal display device further includes two polarizers that are arranged as crossed Nicols, and the direction in which the liquid crystal molecules tilt in each of the multiple liquid crystal regions defines an angle of approximately 45 degrees with respect to the axes of polarization of the two polarizers.

In this particular preferred embodiment, the liquid crystal regions include four liquid crystal regions in which the liquid crystal molecules tilt in first, second, third and fourth directions, respectively. The difference between any two of the first, second, third and fourth directions is substantially equal to an integral multiple of 90 degrees. In any two adjacent ones of the four liquid crystal regions, the direction in which the liquid crystal molecules tilt in one of the two regions is different by approximately 90 degrees from the direction in which the liquid crystal molecules tilt in the other region.

In a specific preferred embodiment, the first electrode has crossed trunk portions, which are arranged so as to overlap with the axes of polarization of the two polarizers, and a number of branch portions, which run from the trunk portion to define an angle of approximately 45 degrees with respect to the trunk portions. The opaque portion is arranged on the first substrate.

In another preferred embodiment, the liquid crystal display device further includes: two vertical alignment films, which are arranged between the first electrode and the liquid crystal layer and between the second electrode and the liquid crystal layer, respectively; and an alignment sustaining layer, which is made of a photopolymerizable compound, which covers the respective surfaces of the two vertical alignment films so as to contact with the liquid crystal layer, and which defines the pretilt direction of the liquid crystal molecules of the liquid crystal layer when no voltage is applied to the liquid crystal layer.

Effects of the Invention

The present invention provides a multi-domain type liquid crystal display device with a vertical alignment liquid crystal layer that can get a display operation done without making the viewer sense any unnaturalness and with the decrease in optical transmittance minimized.

DESCRIPTION OF REFERENCE NUMERALS

Figure 1:
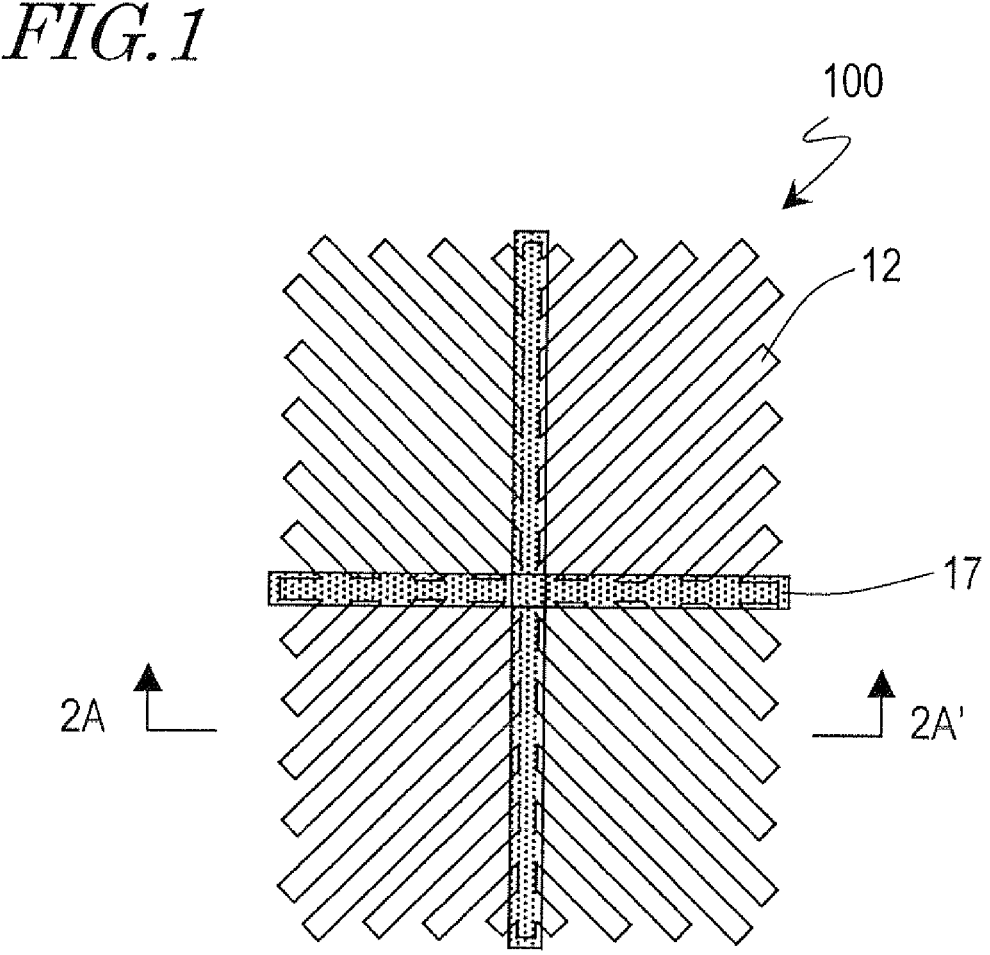
FIG. 1 A top view illustrating a portion of a liquid crystal display device 100, which is allocated to each single pixel, as a preferred embodiment of the present invention.

11, 21 transparent substrate
12 pixel electrode
12*a* trunk portion
12*b* branch portion 13, 23 vertical alignment film
14, 24 alignment sustaining layer
15 interlayer insulating film
16, 26 polarizer
17, 27 opaque portion
17a, 27a first shielding layer
17b, 27b second shielding layer
22 counter electrode
30 liquid crystal layer
30a liquid crystal molecule
100a active-matrix substrate (TFT substrate)
100b counter substrate (color filter substrate)
100, 100A, 100B liquid crystal display device

BEST MODE FOR CARRYING OUT THE
INVENTION

Hereinafter, preferred embodiments of the present invention will be described with reference to the accompanying drawings. In the following description, the present invention will be described as being applied to an active-matrix-addressed LCD with thin-film transistors (TFTs). However, the present invention is in no way limited to such specific preferred embodiments.

Figure 2:
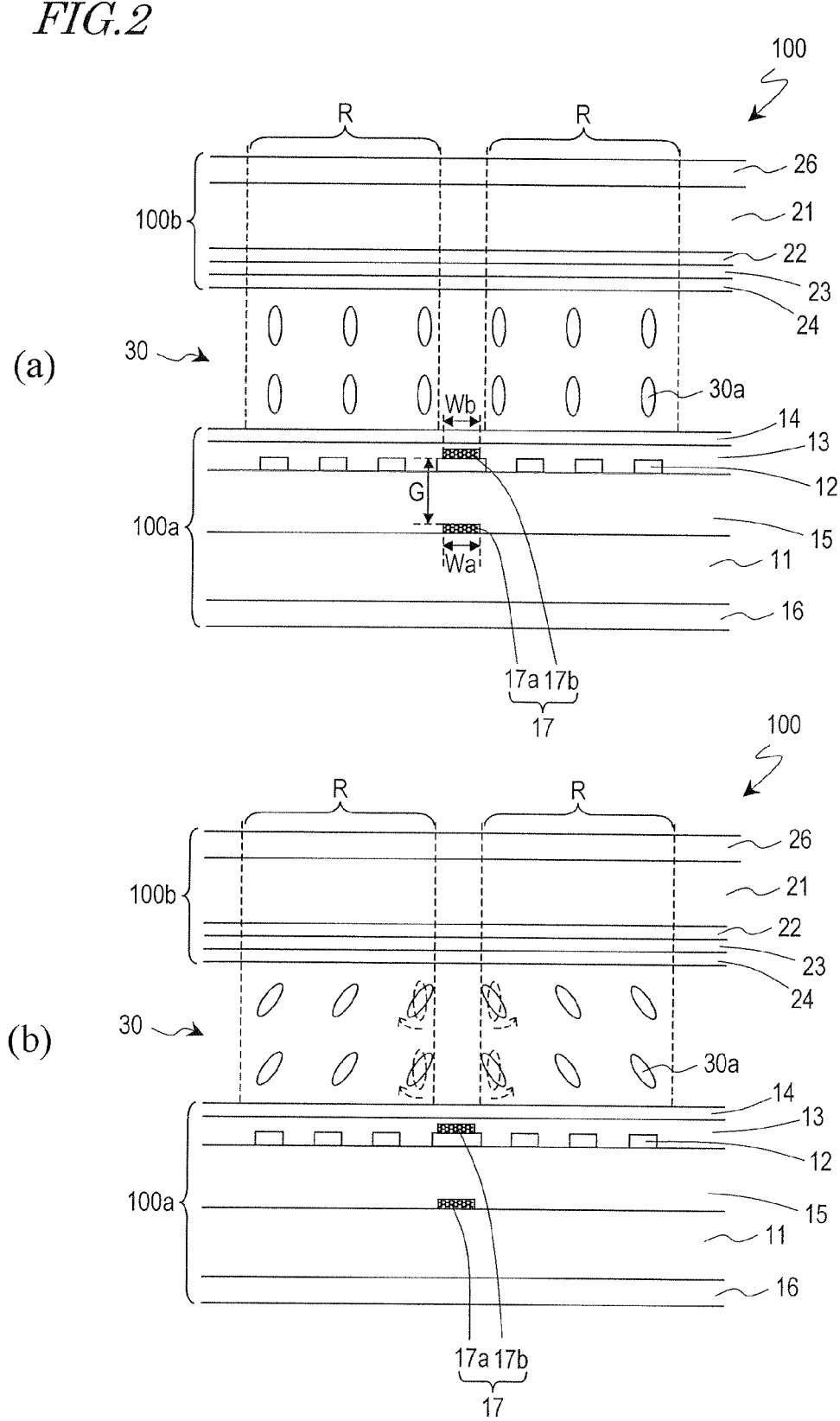
FIG. 2 Cross-sectional views as viewed on the plane 2A-2A' shown in FIG. 1, where: (a) illustrates a state of the device 100 in which no voltage is applied to its liquid crystal layer; and (b) illustrates a state of the device 100 in which a predetermined voltage is applied to the liquid crystal layer.

FIGS. 1 and 2 illustrate a liquid crystal display device 100 as a specific preferred embodiment of the present invention. Specifically, FIG. 1 is a top view illustrating a portion of the liquid crystal display device 100, which is allocated to each single pixel, as viewed along a normal to the display screen. FIGS. 2(a) and 2(b) are cross-sectional views as viewed on the plane 2A-2A' shown in FIG. 1. FIG. 2(a) illustrates a state of the device 100 in which no voltage is applied to its liquid crystal layer 30, while FIG. 2(b) illustrates a state of the device 100 in which a predetermined voltage is applied to the liquid crystal layer 30.

As shown in FIGS. 2(a) and 2(b), the liquid crystal display device 100 includes an active-matrix substrate 100a (which will be referred to herein as a "TFT substrate"), a counter substrate 100b (which will sometimes be referred to herein as a "color filter substrate"), and a vertical alignment liquid crystal layer 30 interposed between the TFT substrate 100a and the counter substrate 100b.

The liquid crystal display device 100 also has a number of pixels, each of which includes a pixel electrode 12 that is arranged on the TFT substrate 100a to face the liquid crystal layer 30, a counter electrode 22 that is arranged on the counter substrate 100b to face the liquid crystal layer 30, and the liquid crystal layer 30 arranged between the pixel electrode 12 and the counter electrode 22. The pixel electrode 12 is arranged over a transparent substrate (such as a glass substrate) 11 with an interlayer insulating film 15 interposed between them, and has a fine-line striped pattern as will be described in detail later. On the other hand, the counter electrode 22 is arranged on another transparent substrate (e.g., a glass substrate) 21. Although not shown in FIG. 2, color filters are arranged between the transparent substrate 21 and the counter electrode 22.

Vertical alignment films 13 and 23 are arranged between the pixel electrode 12 and the liquid crystal layer 30 and between the counter electrode 22 and the liquid crystal layer 30, respectively. The respective surfaces of the vertical alignment films 13 and 23 are covered with alignment sustaining layers 14 and 24, respectively, which are made of a photopolymerizable compound and which are directly in contact with the liquid crystal layer 30.

The alignment sustaining layers 14 and 24 are formed by polymerizing a photopolymerizable compound (typically a photopolymerizable monomer), which has been introduced in advance into the liquid crystal material, with a voltage applied to the liquid crystal layer 30 after the liquid crystal cell is completed. The liquid crystal molecules 30a (which have negative dielectric anisotropy) contained in the liquid crystal layer 30 have their alignment state controlled by the vertical alignment films 13 and 23 until the photopolymerizable compound is polymerized. When a sufficiently high voltage (e.g., a white display voltage) is applied to the liquid crystal layer 30, the liquid crystal molecules 30a will tilt in a predetermined direction due to generation of an oblique electric field around the edges of the fine-line stripe pattern of the pixel electrode 12. The alignment sustaining layers 14 and 24 work to maintain (or retain) the alignment of the liquid crystal molecules 30a while a voltage is applied to the liquid crystal layer 30 as it is even after the voltage has been removed (or even when no voltage is applied). That is why the pretilt direction of the liquid crystal molecules 30a defined by the alignment sustaining layers 14 and 24 (i.e., the direction in which the liquid crystal molecules 30a tilt when no voltage is applied thereto) is the same as the direction in which the liquid crystal molecules 30a tilt when a voltage is applied thereto.

Two polarizers 16 and 26 are arranged on the opposite side of the TFT substrate 100a and the counter substrate 100b (i.e., on their side that faces away from the liquid crystal layer 30). In this case, the polarizers 16 and 26 are arranged as two crossed Nicols. In other words, the polarizers 16 and 26 are arranged so that their respective axes of polarization cross each other at right angles.

As shown in FIG. 1, the pixel electrode 12 has a fine-line stripe pattern, thereby dividing each pixel of the liquid crystal display device 100 into multiple regions. That is to say, the liquid crystal layer 30 has multiple liquid crystal regions R in which the liquid crystal molecules 30a will tilt in mutually different directions when a voltage is applied thereto. Also, as will be described in detail later, there is an opaque portion 17 on the boundary between those liquid crystal regions R. Hereinafter, it will be described with reference to FIG. 3 exactly how the pixel electrode 12 with such a unique shape determines the tilt directions of the liquid crystal molecules 30a in those liquid crystal regions R.

Figure 3:
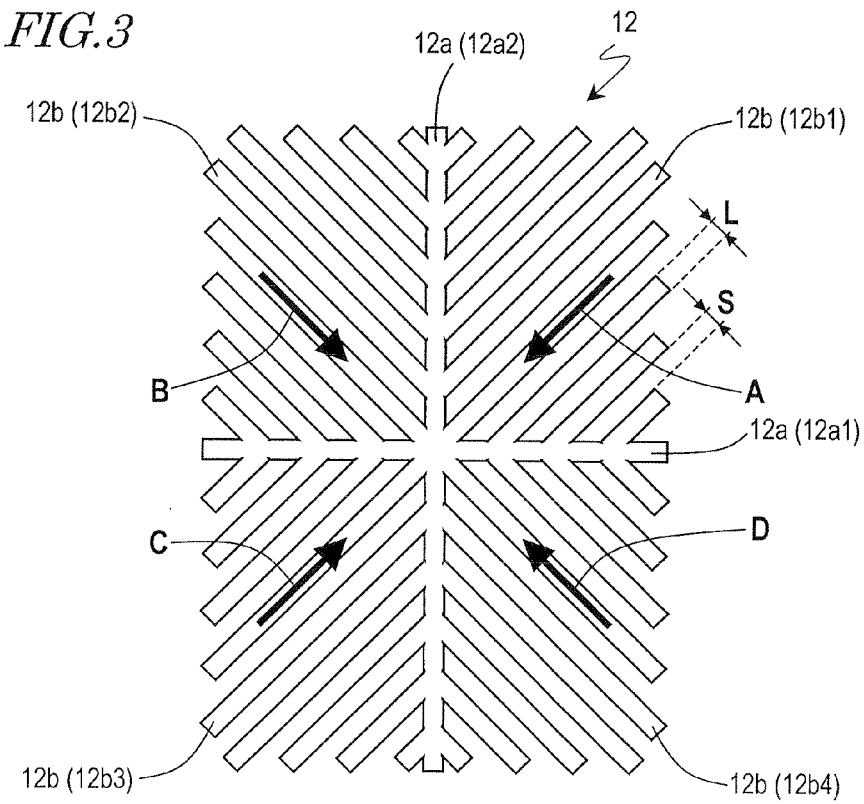
FIG. 3 A plan view illustrating the structure of a pixel electrode that the liquid crystal display device 100 has.

As shown in FIG. 3, the pixel electrode 12 is made up of two crossed trunk portions 12a, which are arranged so as to overlap with the respective axes of polarization of the polarizers 16 and 26, and a number of branch portions 12b that run from those trunk portions 12a so as to define an angle of approximately 45 degrees with respect to the trunk portions 12a. In the example illustrated in FIG. 3, one of the two polarizers 16 and 26 is arranged so that its axis of polarization runs horizontally, while the other polarizer 16 or 26 is arranged so that its axis of polarization runs vertically. That is why the trunk portions 12a has a cross shape in which the two linear portions 12a1 and 12a2 thereof that respectively run horizontally and vertically cross each other around their center. A pixel electrode 12 with such a fine-line stripe pattern is disclosed in Japanese Patent Applications Laid-Open Publications Nos. 2003-149647 and 2006-78968. Also, such a pattern is sometimes called a "fishbone pattern".

The branch portions 12b may be classified into four groups associated with the four regions that are defined by the crossed trunk portions 12a. Comparing the display screen to the face of a clock and supposing that an azimuth angle of zero degrees is represented by three o'clock direction and that the counterclockwise direction is positive, the branch portions 12b can be classified into first, second, third and fourth groups consisting of branch portions 12b1, 12b2, 12b3 and 12b4 that run to define azimuth angles of 45, 135, 225 and 315 degrees, respectively, (with respect to the three o'clock direction).

In each of the first, second, third and fourth groups, the width L of those branch portions 12b and the space S between two adjacent branch portions 12b are typically within the range of 1.5 μm to 5.0 μm. In order to align the liquid crystal molecules 30a with good stability and to increase the luminance as much as possible, the width L and the space S of the branch portions 12b preferably fall within this range.

The tilt direction of the liquid crystal molecules 30a (i.e., the azimuthal component of the major axis of the liquid crystal molecules 30a that are tilted by the electric field) is determined by the oblique electric field to be generated between adjacent ones of the branch portions 12b (i.e., the region from which the conductive film of the pixel electrode 12 is absent). And that direction not only is parallel to the direction in which the branch portions 12b are arranged in stripes but also points toward the trunk portions 12a. More specifically, the tilt directions defined by the first, second, third and fourth groups of branch portions 12b1, 12b2, 12b3 and 12b4 (which will be respectively referred to herein as first, second, third and fourth directions that are indicated by the arrows A, B, C and D) are approximately 225, 315, 45 and 135 degrees, respectively.

As described above, the liquid crystal layer 30 within each pixel has the four liquid crystal regions R in which the liquid crystal molecules 30a tilt in mutually different directions responsive to a voltage applied. And each of the directions A through D in which the liquid crystal molecules 30a tilt in those liquid crystal regions R defines an angle of approximately 45 degrees with respect to the axes of polarization of the two polarizers 16 and 26. Also, the difference between any two of the four directions A through D is substantially equal to an integral multiple of 90 degrees. Furthermore, in any two adjacent ones R of the four liquid crystal regions R, the direction in which the liquid crystal molecules 30a tilt in one of the two regions R is different from the one in which the liquid crystal molecules 30a tilt in the other region R by approximately 90 degrees.

It should be noted that the four liquid crystal regions R to be produced upon the application of a voltage are sometimes called "liquid crystal domains". And those four directions A through D are indicated by the respective directors of the four liquid crystal domains to be produced when a voltage is applied thereto. To realize a bright display by using the retardations caused by the liquid crystal molecules 30a as efficiently as possible, it is most preferred that the director of each of those liquid crystal domains define an angle of approximately 45 degrees with respect to the axes of polarization of the two polarizers 16 and 26. Also, such a structure in which four liquid crystal domains are formed in each pixel will be referred to herein as a "four domain structure" or simply "4D structure". In this example, one 4D structure is supposed to be formed in each pixel. Optionally, if each pixel has multiple such electrode structures, multiple 4D structures could be formed in each pixel, too.

The liquid crystal display device 100 further includes alignment sustaining layers 14 and 24, which work to define the pretilt directions of the liquid crystal molecules 30a in the four liquid crystal regions R when no voltage is applied to the liquid crystal layer 30. And those pretilt directions agree with the directions A through D indicated by the respective directors of the liquid crystal domains with the 4D structure, which is defined by the electrode structure described above. With such alignment sustaining layers 14 and provided, the stability of alignment and the response characteristic both improve.

The alignment sustaining layers 14 and 24 are made by so-called "polymer sustained alignment technology" (which will be sometimes referred to herein as "PSA technology"). Specific methods of making the alignment sustaining layers 14 and 24 by the PSA technology are disclosed in Japanese Patent Application Laid-Open Publication No. 2002-357830, as well as Japanese Patent Applications Laid-Open Publications Nos. 2003-149647 and 2006-78968 mentioned above.

Next, the configuration of the liquid crystal display device 100 will be described in further detail with reference to FIGS. 1 and 2. In the liquid crystal display device 100 of this preferred embodiment, each pixel has an opaque portion 17, which is arranged on the boundary between the liquid crystal regions R. Since the trunk portions 12a of the pixel electrode 12 is located right over the boundary between the liquid crystal regions R in this preferred embodiment, the opaque portion 17 is arranged to overlap with the trunk portions 12a of the pixel electrode 12.

In this example, the opaque portion 17 is arranged on the TFT substrate 100a as shown in FIG. 2. When a voltage is applied between the pixel electrode 12 and the counter electrode 22, the liquid crystal molecules 30a neighboring the boundary between the liquid crystal regions R will tilt while turning one of their end portions, which is located closer to the substrate with the opaque portion 17 (i.e., the TFT substrate 100a), away from the boundary, as can be seen from FIG. 2(b).

The opaque portion 17 includes a first shielding layer 17a and a second shielding layer 17b, which overlaps with the first shielding layer 17a with a predetermined gap G left between them. That is to say, the opaque portion 17 is made up of two shielding layers 17a and 17b that overlap with each other when viewed along a normal to the display screen. In the example illustrated in FIGS. 2(a) and 2(b), the respective widths Wa and Wb of the first and second shielding layers 17a and 17b are supposed to be equal to each other and smaller than the width of the trunk portions 12a of the pixel electrode 12. However, the present invention is in no way limited to that specific preferred embodiment. Alternatively, the widths Wa and Wb of the first and second shielding layers 17a and 17b could be different from each other and could be equal to or greater than the width of the trunk portions 12a of the pixel electrode 12.

The liquid crystal display device 100 has such an opaque portion 17, and therefore, can conduct a display operation so as to make the viewer sense almost no unnaturalness with the variation in display performance, which would otherwise arise depending on whether the viewer is viewing straight or obliquely, minimized. Following is the reason.

Figure 4:
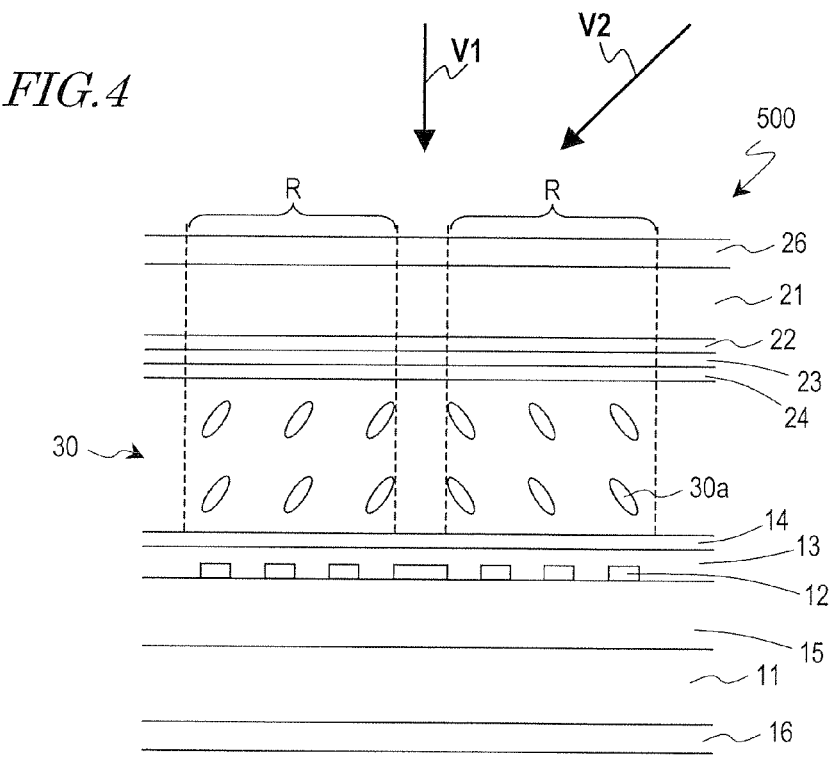
FIG. 4 A cross-sectional view illustrating a liquid crystal display device 500 that has no opaque portions on the boundary between its liquid crystal regions.

First of all, it will be described why a conventional liquid crystal display device with no such opaque portions will make the viewer sense such unnaturalness. FIG. 4 illustrates a comparative liquid crystal display device 500 that has substantially the same configuration as the liquid crystal display device 100 except that the device 500 has no opaque portions on the boundary between the liquid crystal regions R.

In the liquid crystal display device 500, each pixel is also divided into multiple liquid crystal regions R, and therefore, its display performance has lighter azimuth angle dependence. However, the display performance of the liquid crystal display device 500 will vary significantly depending on whether the viewer is located right in front of the screen or obliquely to the screen.

Figure 5:
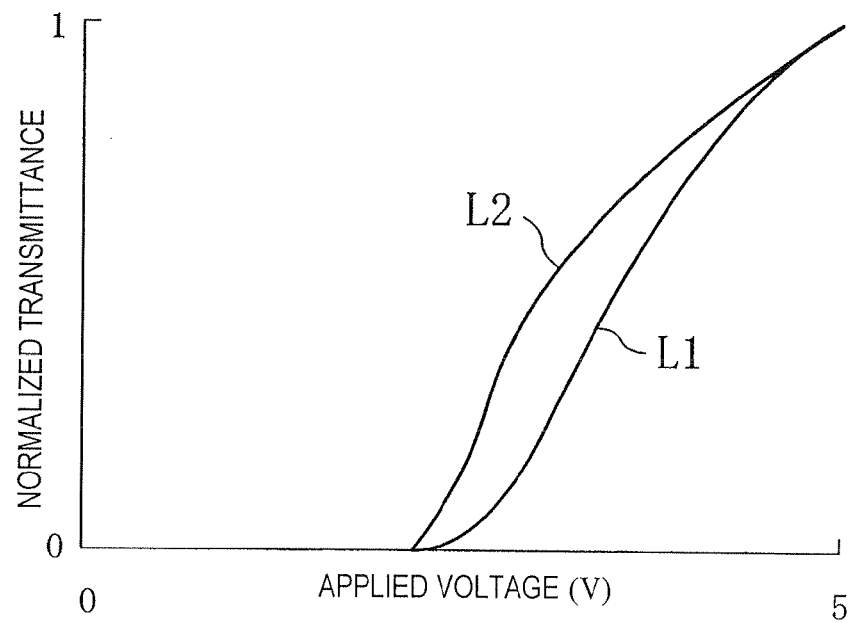
FIG. 5 A graph showing the voltage-transmittance characteristics of the liquid crystal display device 500 in a situation where the viewer was viewing the device 500 straight and in a situation where he or she was viewing it obliquely.

FIG. 5 shows normalized voltage-transmittance characteristics that were obtained in a situation where the viewer was viewing the liquid crystal display device 500 from right in front of the device 500 (i.e., in the direction indicated by the arrow V1 in FIG. 4) and in a situation where he or she was viewing it obliquely (i.e., in the direction indicated by the arrow V2 in FIG. 4) with the viewing angle tilted along the axis of polarization. In FIG. 5, the abscissa represents the voltage (V) applied to the liquid crystal layer 30 and the ordinate represents the normalized transmittance.

As can be seen from FIG. 5, the voltage-transmittance curve L2 associated with the oblique viewing direction is steeper than the voltage-transmittance curve L1 associated with the straight viewing direction. And when a half-scale tone voltage is applied, the transmittance in the oblique viewing direction is higher than the one in the straight viewing direction.

The transmittance in the oblique viewing direction increases at a half-scale tone voltage due to the behavior of the liquid crystal molecules 30a in a particular one of the liquid crystal regions R within each pixel. More specifically, the transmittance is increased by the behavior of the liquid crystal molecules 30a that tilt in the opposite direction to the oblique viewing direction (i.e., the molecules 30a that tilt while turning one of its ends, which is located closer to the counter substrate 100b, away from the viewer).

Now take a look at the two liquid crystal regions R shown in FIG. 4. When these two liquid crystal regions R are viewed with the viewing angle tilted along the axis of polarization (i.e., in the direction indicated by the arrow V2 in FIG. 4), the liquid crystal molecules 30a in both of these two liquid crystal regions will tilt so as to define an angle of 45 degrees with respect to the axis of polarization. However, the liquid crystal molecules 30a in the liquid crystal region R on the left-hand side will face toward the viewer, while the liquid crystal molecules 30a in the liquid crystal region R on the right-hand side will face away from the viewer.

Figure 6:
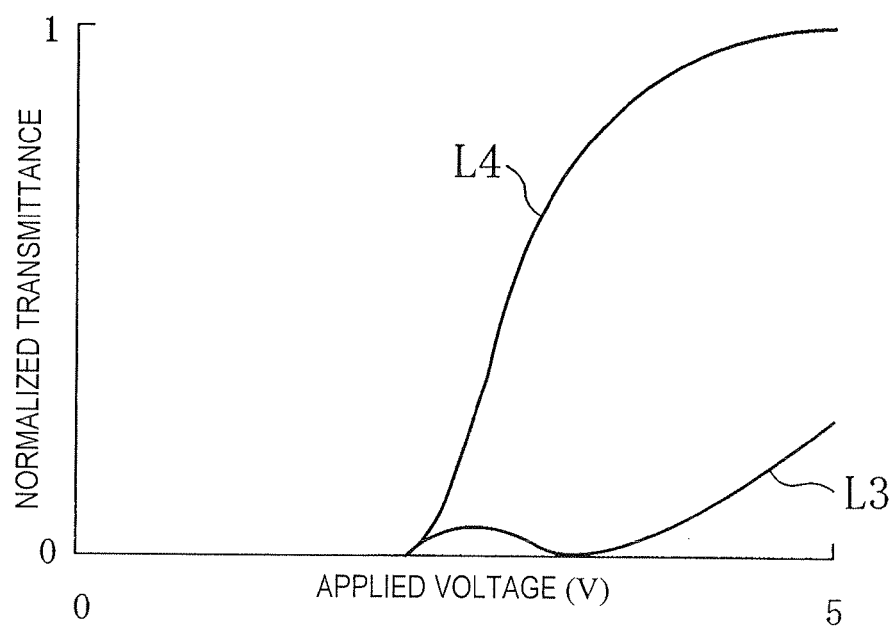
FIG. 6 A graph showing voltage-transmittance characteristics in a situation where the viewer was viewing obliquely a liquid crystal region where liquid crystal molecules were tilted to face toward the viewer and in a situation where the viewer was viewing obliquely a liquid crystal region where liquid crystal molecules were tilted to face away from the viewer, respectively.

FIG. 6 shows the voltage-transmittance characteristics that were obtained in a situation where the two liquid crystal regions R shown in FIG. 4 were viewed obliquely. More specifically, this is a graph showing voltage-transmittance curves L3 and L4 associated respectively with the liquid crystal region R in which the liquid crystal molecules 30a tilting face toward the viewer (i.e., the liquid crystal region R shown on the left hand side of FIG. 4) and the liquid crystal region R in which the liquid crystal molecules 30a tilting face away from the viewer (i.e., the liquid crystal region R shown on the right hand side of FIG. 4).

As shown in FIG. 6, in the liquid crystal region R in which the liquid crystal molecules 30a face toward the viewer, as the voltage rises, the transmittance once decreases and then increases as represented by the curve L3. On the other hand, in the liquid crystal region R in which the liquid crystal molecules 30a face away from the viewer, as the voltage rises, the transmittance increases almost monotonically as represented by the curve L4. These results were obtained because the retardation value with respect to the incoming light that strikes obliquely the liquid crystal layer 30 (i.e., obliquely with respect to a normal to the display screen) will once decrease and then increase with a rise in voltage in the liquid crystal region R where the liquid crystal molecules 30a face toward the viewer but will increase almost monotonically with a rise in voltage in the liquid crystal region R where the liquid crystal molecules 30a face away from the viewer.

The voltage-transmittance characteristic associated with the oblique viewing direction shown in FIG. 5 was obtained by adding together the two voltage-transmittance characteristics associated with the respective liquid crystal regions R shown in FIG. 6. That is why the transmittance in the oblique viewing direction increases at a half-scale tone voltage probably due to the behavior of the liquid crystal molecules 30a that face away from the viewer.

In the liquid crystal display device 100 of this preferred embodiment, the opaque portion 17 is arranged on the boundary between the multiple liquid crystal regions R and is provided for at least one of the two substrates (e.g., the TFT substrate 100a as in this preferred embodiment) so that when a voltage is applied, the liquid crystal molecules 30a neighboring the boundary will tilt while turning one of their end portions, which is located closer to the substrate with the opaque portion 17, away from the boundary.

Such an opaque portion 17 selectively shields one of two adjacent liquid crystal regions R, where the liquid crystal molecules 30a will face away from the viewer (and where the retardation value with respect to the obliquely incoming light will increase almost monotonically with a rise in voltage), from the incoming light when the viewer is viewing the screen obliquely (i.e., obliquely with respect to a normal to the display screen).

Figure 7:
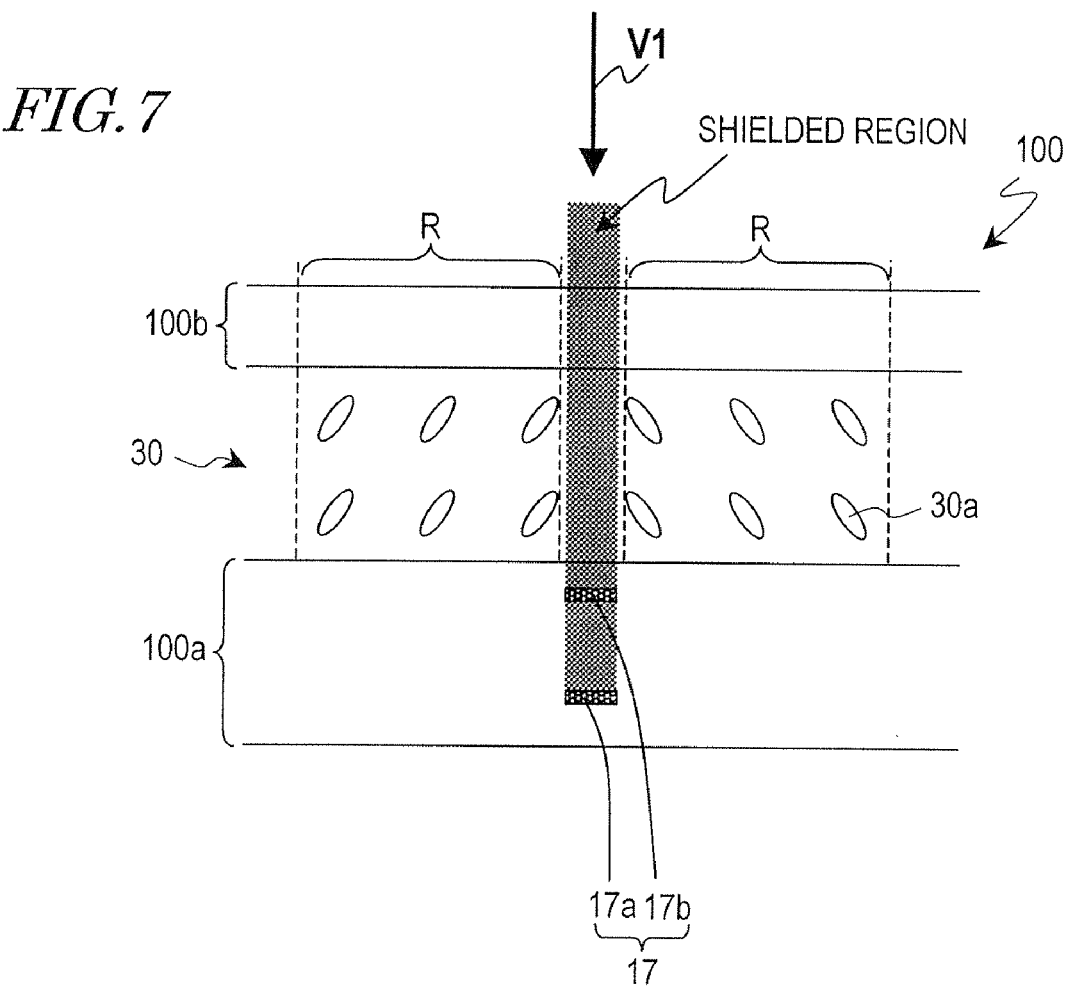
FIG. 7 A diagram schematically illustrating a region to be shielded by the opaque portion when the liquid crystal display device 100 is viewed straight.
Figure 8:
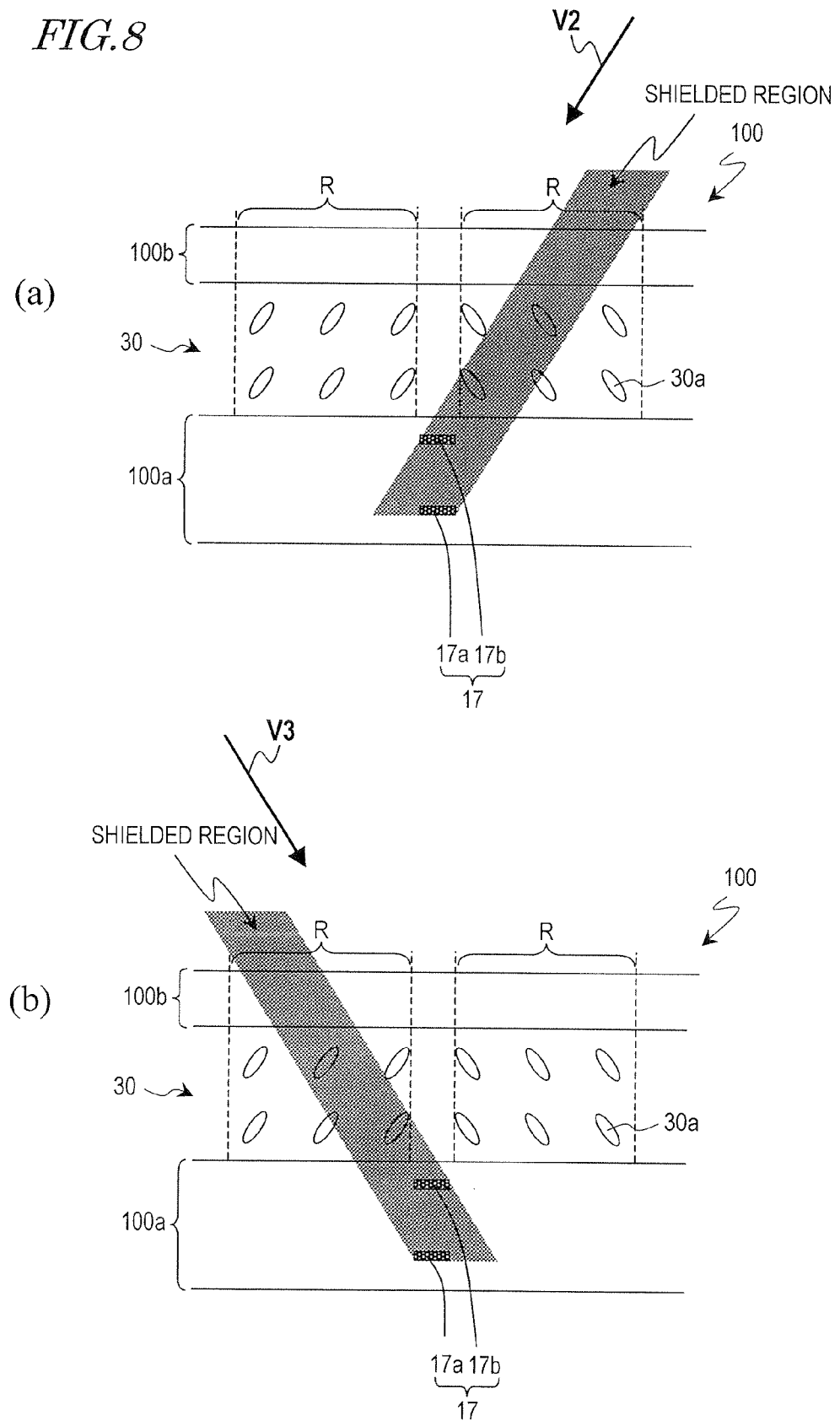
FIGS. 8 (a) and (b) schematically illustrate respective regions to be shielded by the opaque portion when the liquid crystal display device 100 is viewed obliquely.

FIGS. 7 and 8 schematically illustrates regions to be shielded from incoming light by the opaque portion 17 when the liquid crystal display device 100 is viewed from the straight viewing direction V1 and from the oblique viewing directions V2 and V3, respectively.

As shown in FIG. 7, when the device 100 is viewed from the straight viewing direction V1, the opaque portion 17 shields a portion of the liquid crystal layer 30 that is located right over itself. That is why in such a situation, the two liquid crystal regions R continue to contribute to the display operation to the same degrees as usual.

On the other hand, when the device 100 is viewed from the oblique viewing direction V2 as shown in FIG. 8(a), a parallax is produced, and therefore, the opaque portion 17 selectively shields the liquid crystal region R where the liquid crystal molecules 30a face away from the viewer (i.e., the liquid crystal region R on the right hand side). Likewise, when the device 100 is viewed from the other oblique viewing direction V3 as shown in FIG. 8(b), the opaque portion 17 also selectively shields the liquid crystal region R where the liquid crystal molecules 30a face away from the viewer (i.e., the liquid crystal region R on the left hand side). That is why a part of such a liquid crystal region R where the liquid crystal molecules 30a face away from the viewer no longer contributes to the display operation in the oblique viewing direction. As a result, the increase in transmittance at a half-scale tone voltage can be minimized and the voltage-transmittance characteristic in the oblique viewing direction can be closer to the one in the straight viewing direction. Consequently, the display performance in the oblique viewing direction can be closer to the one in the straight viewing direction, thus making the viewer sense much less unnaturalness.

Also, the opaque portion 17 of the liquid crystal display device 100 of this preferred embodiment includes a first shielding layer 17a and a second shielding layer 17b, which overlaps with the first shielding layer 17a with a predetermined gap G left between them. With such a multilayer opaque portion 17, the optical transmittance in the straight viewing direction would decrease much less significantly than with a single-layer opaque portion as disclosed in Patent Document No. 2.

Figure 9:
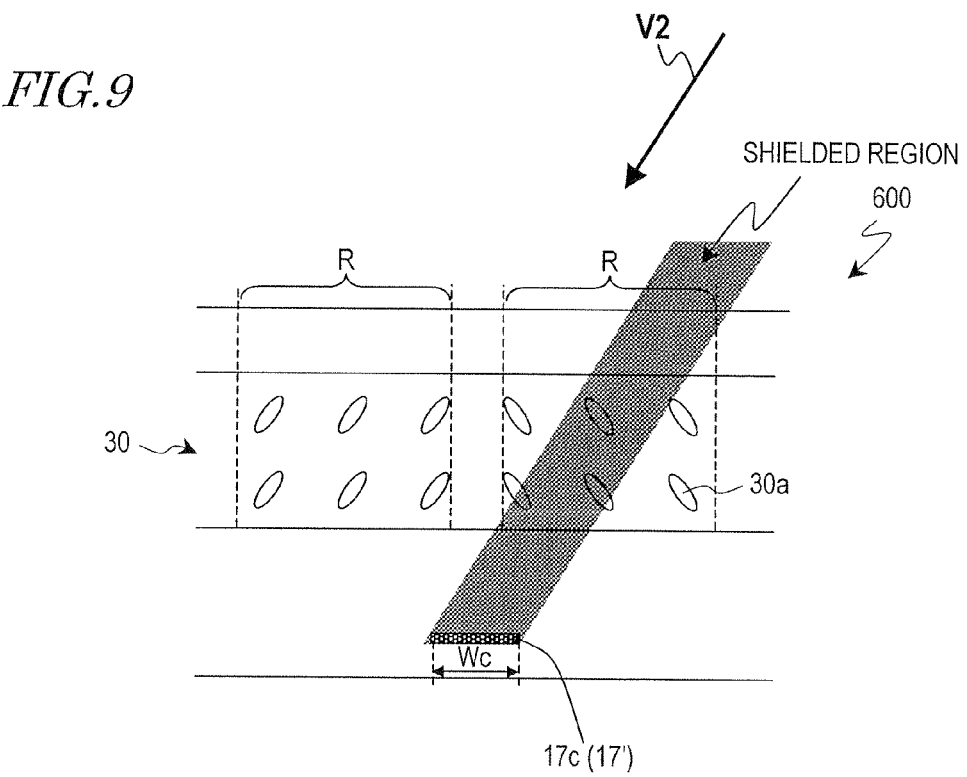
FIG. 9 A diagram schematically illustrating a region to be shielded by the opaque portion when a liquid crystal display device 600 with a single-layer opaque portion is viewed obliquely.

FIG. 9 illustrates an example of such a liquid crystal display device with a single-layer opaque portion. The liquid crystal display device 600 shown in FIG. 9 has substantially the same configuration as its counterpart 100 shown in FIG. 2 except that its opaque portion 17' consists of only one shielding layer 17c. When the device 600 is viewed from the oblique viewing direction V2 or V3, the opaque portion 17' can also selectively shield the liquid crystal region R where the liquid crystal molecules 30a face away from the viewer, thus getting a display operation done while making the viewer sense much less unnaturalness. Nevertheless, if a region of the same size needs to be shielded, the single-layer opaque portion 17' should use a shielding layer 17c with a broader width We than the multilayer opaque portion 17 as can be seen easily by comparing FIG. 9 to FIG. 8(a).

Stated otherwise, in the liquid crystal display device 100 of this preferred embodiment, the minimum required widths of the first and second shielding layers 17a and 17b (i.e., the widths Wa and Wb shown in FIG. 2(a)) to eliminate the sense of unnaturalness as much as possible can be reduced. This is because the first and second shielding layers 17a and 17b that are stacked one upon the other along a normal to the display screen with a predetermined gap G left between them can shield mutually different regions (which may naturally overlap with each other in some cases, though) when the viewer is viewing obliquely. As a result, the decrease in optical transmittance in the straight viewing direction can be minimized and a brighter display is realized. Hereinafter, it will be described in further detail how effectively the decrease in optical transmittance can be minimized by the multilayer opaque portion 17.

Figure 10:
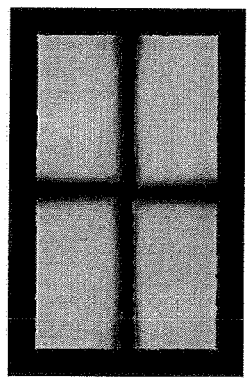
FIGS. 10 (a), (b) and (c) show the respective results of simulations that were carried out to get the distribution of transmittance in pixels in a white display state when the viewer was viewing straight the liquid crystal display device 500, 600 or 100.
Figure 10:
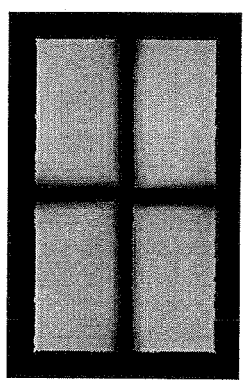
Figure 10:
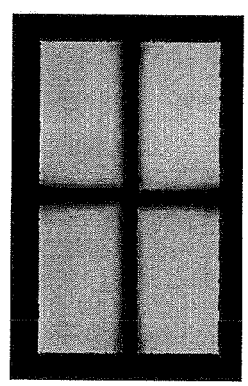
Figure 11:
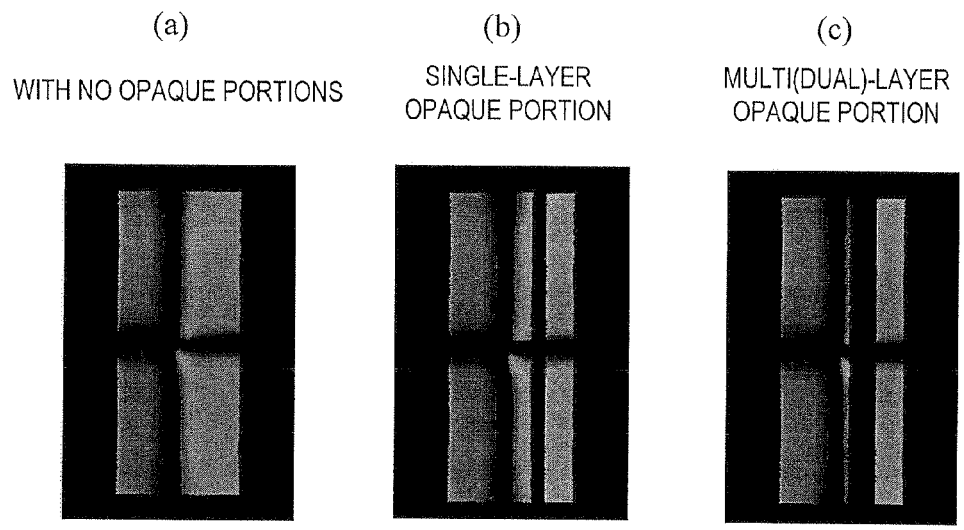
FIGS. 11 (a), (b) and (c) show the respective results of simulations that were carried out to get the distribution of transmittance in pixels in a white display state when the viewer was viewing obliquely the liquid crystal display device 500, 600 or 100.

FIGS. 10 and 11 show the results of simulations that were carried out to get the distribution of transmittance in pixels in a white display state on the liquid crystal display device 500 with no opaque portions at all, the liquid crystal display device 600 with the single-layer opaque portion 17', and the liquid crystal display device 100 with the multilayer opaque portion 17. Specifically, FIGS. 10(a), 10(b) and 10(c) show the distributions of transmittance that were obtained when the viewer was viewing straight. On the other hand, FIGS. 11(a), 11(b) and 11(c) show the distributions of transmittance that were obtained when the viewer was viewing obliquely (i.e., if the viewing angle is tilted toward the three o'clock direction represented by an azimuth angle of zero degrees).

In this case, the pixels that were used to make the simulations had pitches of 25.5 μm×76.5 μm, which are large enough to make a 2 to 3 inch VGA class LCD. As for the pixel electrode 12 with a fishbone pattern, its trunk portions 12a had a thickness (i.e., the width of the horizontally and vertically running linear portions 12a1 and 12a2) of 2.5 μm, there were four branch portions 12b per liquid crystal region corresponding to any of the four liquid crystal domains, and the branch portions 12b had a width L of 2.5 μm and a space S of 2.5 μm. Each of the shielding layers 17a, 17b and 17c had a width of 1.5 μm.

As shown in FIG. 10(a), when the viewer was viewing straight the liquid crystal display device 500 with no opaque portions, the four liquid crystal domains had substantially uniform white display state and the boundary between those liquid crystal domains was clearly seen as crossed dark lines parallel to the axes of absorption of the polarizers that were arranged as two crossed Nicols. Consequently, it can be seen that the 4D structure had definitely been formed and that almost all of the liquid crystal molecules 30a within each liquid crystal domain were aligned in their predetermined director orientation (i.e., so as to define an angle of 45 degrees with respect to the axes of polarization of the polarizers). Also, since no opaque portions were provided for the boundary between the liquid crystal domains of the liquid crystal display device 500, no liquid crystal domain was shielded in particular even when the viewer was viewing obliquely. As a result, respective portions of the liquid crystal domains that contributed to getting a display operation done had substantially equal areas as shown in FIG. 11(a).

Meanwhile, in the liquid crystal display device 600 with the single-layer opaque portion 17' and in the liquid crystal display device 100 with the multilayer opaque portion 17, when the viewer was viewing straight one of them, the boundary between the liquid crystal domains was shielded with the opaque portion 17' or 17 as shown in FIGS. 10(b) and 10(c), respectively. On the other hand, when the viewer was viewing one of them obliquely, the opaque portion 17' or 17 selectively shielded two of the four liquid crystal domains on the right-hand side as shown in FIGS. 11(b) and 11(c), respectively. Nevertheless, as can be seen easily by comparing FIGS. 11(b) and 11(c) to each other, the multilayer opaque portion 17 shielded a greater area than the single-layer opaque portion 17' did.

As can be seen, supposing their shielding layers have the same width, the multilayer opaque portion 17 can shield a greater area than the single-layer opaque portion 17'. Thus, supposing the multilayer opaque portion 17 and the single-layer opaque portion 17' are shielding regions of the same size from incoming light for the viewer who is viewing the LCD obliquely, the respective widths Wa and Wb of the shielding layers 17a and 17b that form the multilayer opaque portion 17 are smaller than the width Wc of the only shielding layer 17c of the single-layer opaque portion 17'. Consequently, the liquid crystal display device 100 of this preferred embodiment can get a display operation done almost without making the viewer sense any unnaturalness and with the decrease in optical transmittance minimized.

Figure 12:
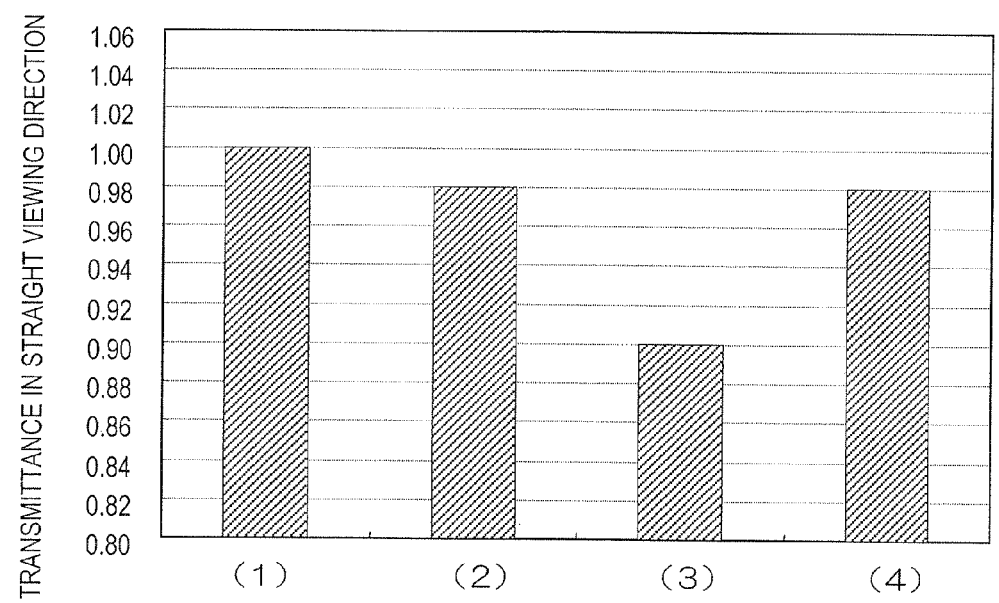
FIG. 12 A graph showing optical transmittances obtained in the straight viewing direction (1) when no opaque portions were provided at all, (2) when a single-layer opaque portion having a shielding layer with a width of 1.5 µm was provided, (3) when a single-layer opaque portion having a shielding layer with a width of 3.0 µm was provided, and (4) when a multilayer (dual-layer in this case) opaque portion having two shielding layers with a width of 1.5 µm each were provided, respectively.

FIG. 12 shows the optical transmittances that were measured in the straight viewing direction in four different situations (1) where no opaque portions were provided at all, (2) where a single-layer opaque portion 17', including a shielding layer 17c with a width of 1.5 μm, was provided, (3) where a single-layer opaque portion 17', including a shielding layer 17c with a width of 3.0 μm, was provided, and (4) where a multilayer (i.e., dual-layer) opaque portion 17, including shielding layers 17a and 17b with a width of 1.5 μm, was provided. FIGS. 13(a) through 13(d) show the respective distributions of transmittance in pixels in a white display state under the respective situations (1) through (4).

Figure 13:
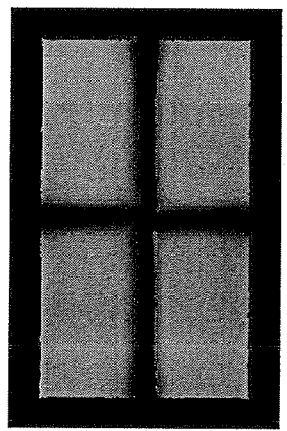
FIG. 13 (a) through (d) show the results of simulations that were carried out to get the distributions of transmittance in pixels in a white display state and when the viewer was viewing straight in those four different situations (1) through (4), respectively.
Figure 13:
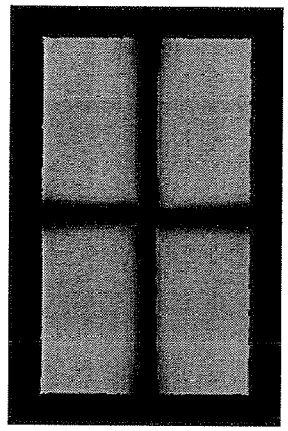
Figure 13:
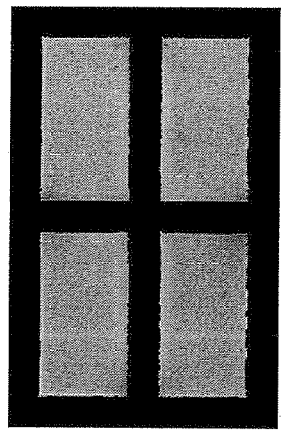
Figure 13:
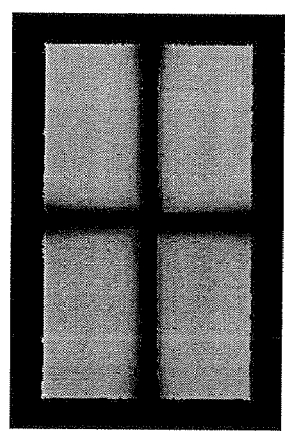

As can be seen from FIG. 13(a), the boundary between the multiple liquid crystal regions R is supposed to be recognized as dark lines from the beginning and will hardly contribute to getting a display operation done. That is why as can be seen from FIGS. 12, 13(b) and 13(d), the optical transmittance hardly decreased in the situations (2) and (4) where the shielding layers had a narrow width. On the other hand, as can be seen from FIGS. 12 and 13(c), the optical transmittance decreased considerably in the situation (3) where the shielding layer had a broad width.

Figure 14:
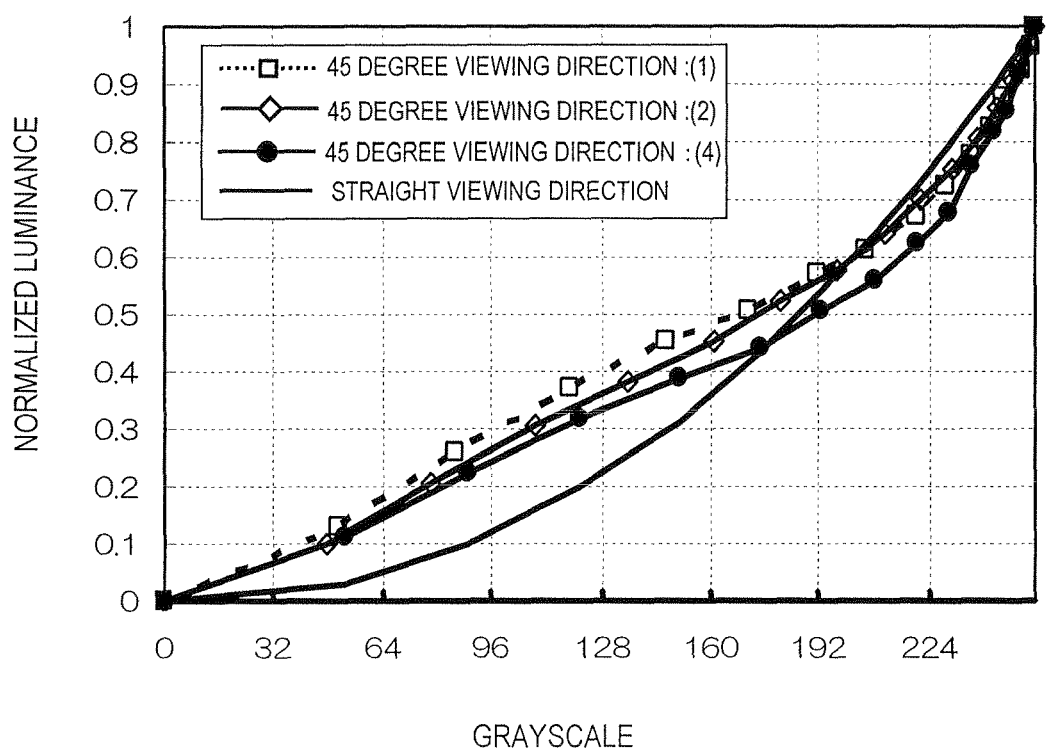
FIG. 14 A graph showing the grayscale dependences of normalized luminance in straight and 45 degree viewing directions, respectively.

FIG. 14 shows the grayscale dependence of a normalized luminance in the straight viewing direction and in the 45 degree viewing direction (which is defined, in combination, by a tilt angle of 45 degrees with respect to a normal to the display screen and by an azimuth angle of zero degrees). As used herein, the normalized luminance is obtained by normalizing the luminance in each direction with the luminance in that direction responsive to a white voltage (i.e., the highest grayscale voltage) applied supposed to be unity. As can be seen from FIG. 14, the curve representing the normalized luminance in the straight viewing direction is different from the curves representing the normalized luminances in the 45 degree viewing direction. This means that the γ characteristic on the display screen varies depending on whether the viewer is viewing straight or obliquely. Still it can be seen that the increase in luminance at half scale tones was smaller in the situations (2) and (4) where the opaque portion was provided than in the situation (1) where no opaque portions were provided at all. It can also be seen that even though the shielding layers had exactly the same width, the increase in luminance was even smaller in the situation (4) where the multilayer opaque portion 17 was used than in the situation (2) where the single-layer opaque portion 17' was used. Although not shown in FIG. 14, if the width of the shielding layer was increased as in the situation (3), a viewing angle characteristic comparable to that of the situation (4) would be realized. In that case, however, the optical transmittance in the straight viewing direction would decrease significantly.

As described above, in the liquid crystal display device 100 of this preferred embodiment, the multilayer opaque portion 17 is arranged on the boundary between the multiple liquid crystal regions R, thus getting a display operation done while making the viewer sense much less unnaturalness with the decrease in optical transmittance minimized. The arrangement, width, shape and other parameters of the first and second shielding layers 17a and 17b that form the opaque portion 17 are not limited to the ones adopted in the preferred embodiment described above, but may be determined appropriately according to the specifications of the liquid crystal display device and the optical transmittance or display performance required.

In the example illustrated in FIG. 2, the first shielding layer 17a is supposed to be arranged on the transparent substrate 11 and the second shielding layer 17b is supposed to be arranged on the pixel electrode 12. However, the first and second shielding layers 17a and 17b just need to be arranged so as to overlap with each other with a predetermined gap G left between them when viewed along a normal to the display screen. That is to say, these shielding layers 17a and 17b may be positioned at any other levels within the multilayer structure of the TFT substrate 100a. For example, the second shielding layer 17b may be arranged under the pixel electrode 12, not over that electrode 12.

The first and second shielding layers 17a and 17b may be made of a shielding material such as a metallic material like aluminum or a resin including a pigment, and may be formed at any stages during the manufacturing process of the TFT substrate 100a. If the first and second shielding layers 17a and 17b are made of the same film as opaque members (such as gate and source bus lines) originally included in the TFT substrate 100a, then there is no need to perform any additional process step of forming the first and second shielding layers 17a and 17b.

It should be noted that the opaque portion 17 does not have to have the dual-layer structure that is adopted in the preferred embodiment described above. Optionally, the opaque portion 17 may also have a three-layer structure including not only the first and second shielding layers 17a and 17b but also a third shielding layer as well.

The widths Wa and Wb of the first and second shielding layers 17a and 17b and their gap G just need to be determined according to the thickness of the liquid crystal layer 30 and the size of the liquid crystal region R so that the liquid crystal region R can be shielded effectively. Specifically, the widths Wa and Wb of the first and second shielding layers 17a and 17b is preferably not much greater than the width of the boundary between the liquid crystal domains (i.e., the regions to be recognized as dark lines in the white display state) in order to minimize the decrease in transmittance in the straight viewing direction. More specifically, those widths Wa and Wb need to be determined so that when the opaque portion 17 is provided, the optical transmittance in the straight viewing direction will decrease by not more than 10% compared to a situation where no opaque portions 17 are provided at all, and may be 3 μm or less, for example.

Also, in the preferred embodiment described above, the 4D structure is supposed to be formed by the pixel electrode 12 with the fishbone pattern. However, the present invention is in no way limited to that specific preferred embodiment. The multi-domain structure can also be formed by any of various known methods. For example, multiple liquid crystal domains can also be produced by using various orientation control structures (including the slits and/or projections as disclosed in Patent Document No. 1) in any combination in an ordinary MVA mode.

Optionally, multiple domains may also be produced by optical alignment treatment (optical alignment process), which is disclosed in Japanese Patent Applications Laid-Open Publications Nos. 2-277025 and 4-303827, for example. The optical alignment treatment is a technique for producing anchoring force by irradiating an alignment film, which is made of a compound with a photoreactive functional group, with a polarized ultraviolet ray and getting an anisotropic chemical reaction produced by molecules in the alignment film. According to recently developed methods, the alignment film is sometimes irradiated with a non-polarized ultraviolet ray, instead of the polarized ultraviolet ray. Such an alignment film that has gained the anchoring force through the optical alignment treatment is sometimes called an "optical alignment film". Alternatively, multiple domains could also be produced by using a nanostructure pattern, which may be formed by so-called "nano rubbing process" that uses an atomic force microscope (AFM), for example.

Since multiple domains can be produced by any of various methods as described above, the boundary between the liquid crystal domains to be produced in response to a voltage applied does not have to have the cross shape as shown in FIG. 13(a). That is why the shape of the opaque portion 17 (i.e., the shape of the first and second shielding layers 17a and 17b as viewed along a normal to the display screen) does not have to be cross as shown in FIG. 1, either. For example, if projections and/or slits with a zigzag pattern as disclosed in Patent Document No. 1 are used, then the opaque portion 17 may also have a corresponding zigzag shape.

Furthermore, in the preferred embodiments described above, the opaque portion 17 is supposed to be provided for only the TFT substrate 100a. According to the method of forming multiple domains, however, the opaque portion(s) may be provided for only the counter substrate 100b or both of the TFT substrate 100a and the counter substrate 100b.

Figure 15:
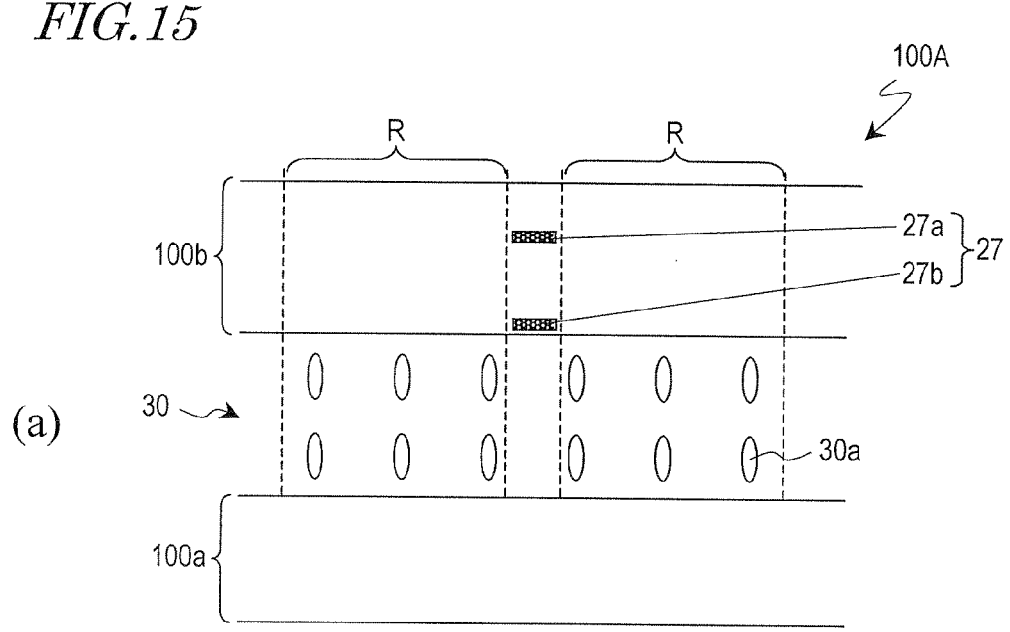
FIG. 15 Cross-sectional views illustrating a liquid crystal display device 100A as another preferred embodiment of the present invention, where: (a) illustrates a state where no voltage is applied to its liquid crystal layer; and (b) illustrates a state where a predetermined voltage is applied to its liquid crystal layer.
Figure 15:
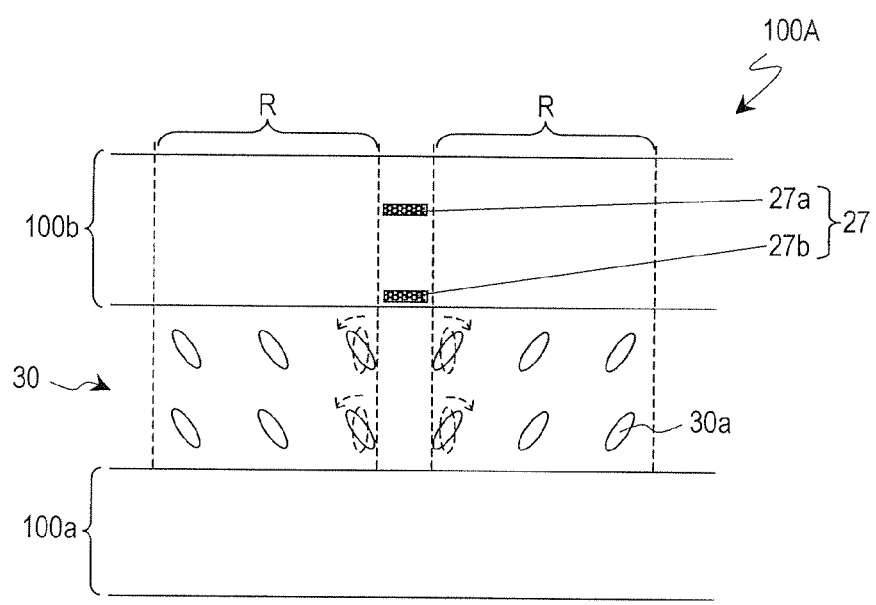

FIGS. 15(a) and 15(b) illustrate a liquid crystal display device 100A as another specific preferred embodiment of the present invention. This liquid crystal display device 100A includes an opaque portion 27 on the counter substrate 100b, which is a major difference from the liquid crystal display device 100 shown in FIG. 2.

The opaque portion 27 on the counter substrate 100b is also arranged on the boundary between multiple liquid crystal regions R. When a voltage is applied to the liquid crystal layer 30, the liquid crystal molecules 30a neighboring the boundary between the liquid crystal regions R will tilt while turning one of their end portions, which is located closer to the substrate with the opaque portion 27 (i.e., the counter substrate 100b in this case), away from the boundary, as can be seen from FIG. 15(b). The opaque portion 27 also includes a first shielding layer 27a and a second shielding layer 27b, which overlaps with the first shielding layer 27a with a predetermined gap left between them. That is to say, the opaque portion 27 consists of two shielding layers 27a and 27b that overlap with each other when viewed along a normal to the display screen.

Such an opaque portion 27 selectively shields one of two adjacent liquid crystal regions R, where the liquid crystal molecules 30a will face away from the viewer (and where the retardation value with respect to the obliquely incoming light will increase almost monotonically with a rise in voltage), from the incoming light when the viewer is viewing the screen obliquely (i.e., obliquely with respect to a normal to the display screen).

Figure 16:
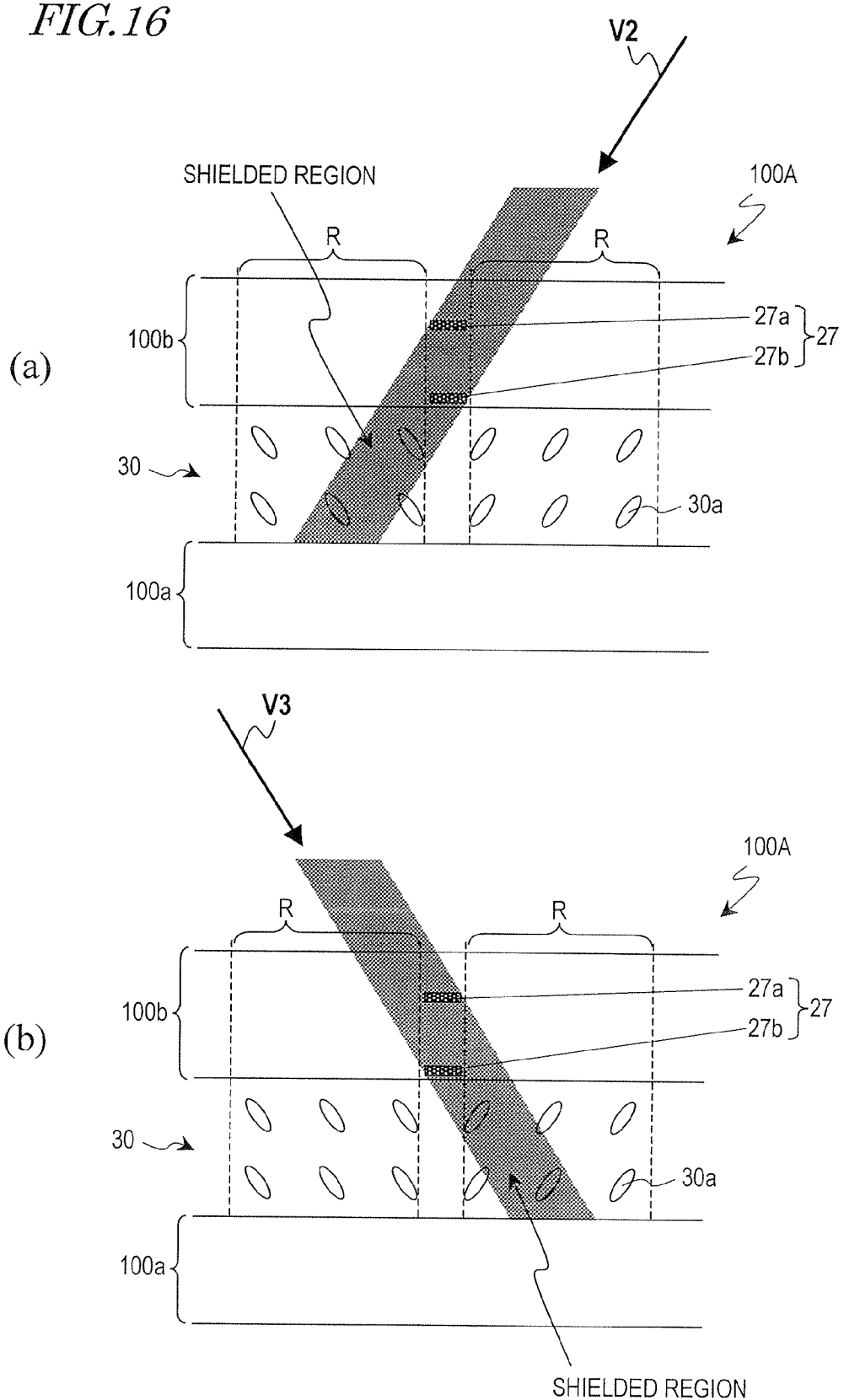
FIGS. 16 (a) and (b) schematically illustrate regions to be shielded by the opaque portion when the liquid crystal display device 100A is viewed obliquely.

FIG. 16 schematically illustrates regions to be shielded from incoming light by the opaque portion 27 when the liquid crystal display device 100A is viewed from the oblique viewing directions V2 and V3. When the device 100A is viewed from the oblique viewing direction V2 as shown in FIG. 16(a), the opaque portion 27 selectively shields the liquid crystal region R where the liquid crystal molecules 30a face away from the viewer (i.e., the liquid crystal region R on the left hand side). Likewise, when the device 100A is viewed from the other oblique viewing direction V3 as shown in FIG. 16(b), the opaque portion 27 also selectively shields the liquid crystal region R where the liquid crystal molecules 30a face away from the viewer (i.e., the liquid crystal region R on the right hand side). Consequently, the display performance in the oblique viewing direction can be closer to the one in the straight viewing direction, thus making the viewer sense much less unnaturalness.

Also, the opaque portion 27 of the liquid crystal display device 100A includes a first shielding layer 27a and a second shielding layer 27b, which overlaps with the first shielding layer 27a with a predetermined gap left between them. Consequently, the optical transmittance in the straight viewing direction would decrease much less significantly.

Even though the opaque portion 17 is provided for the TFT substrate 100a in the liquid crystal display device 100 described above, the opaque portion 27 is provided for the counter substrate 100b in this liquid crystal display device 100A. In either case, these liquid crystal display devices 100 and 100A can selectively shield a liquid crystal region R in which the liquid crystal molecules 30a face away from the viewer.

As to which of the two substrates the opaque portion that overlaps with a boundary between multiple liquid crystal regions R should be provided for, it may be determined by deciding which of the two substrates 100a and 100b the liquid crystal molecules 30a, which are now located around, but going to tilt and turn away from, the boundary, have one of their end portions located closer to. In other words, the opaque portion may be provided so that when a voltage is applied, the liquid crystal molecules 30a neighboring the boundary will tilt while turning one of their end portions, which is located closer to the substrate with the opaque portion, away from the boundary.

Specifically, if the liquid crystal molecules 30a, which are now located around, but going to tilt and turn away from, the boundary, have one of their end portions located closer to the TFT substrate 100a, then the opaque portion may be provided for the TFT substrate 100a. On the other hand, if the liquid crystal molecules 30a, which are now located around, but going to tilt and turn away from, the boundary, have one of their end portions located closer to the counter substrate 100b, then the opaque portion may be provided for the counter substrate 100b. That is why if the two types of boundaries described above are included within each pixel, the opaque portions may be provided for both of the TFT substrate 100a and the counter substrate 100b.

Figure 17:
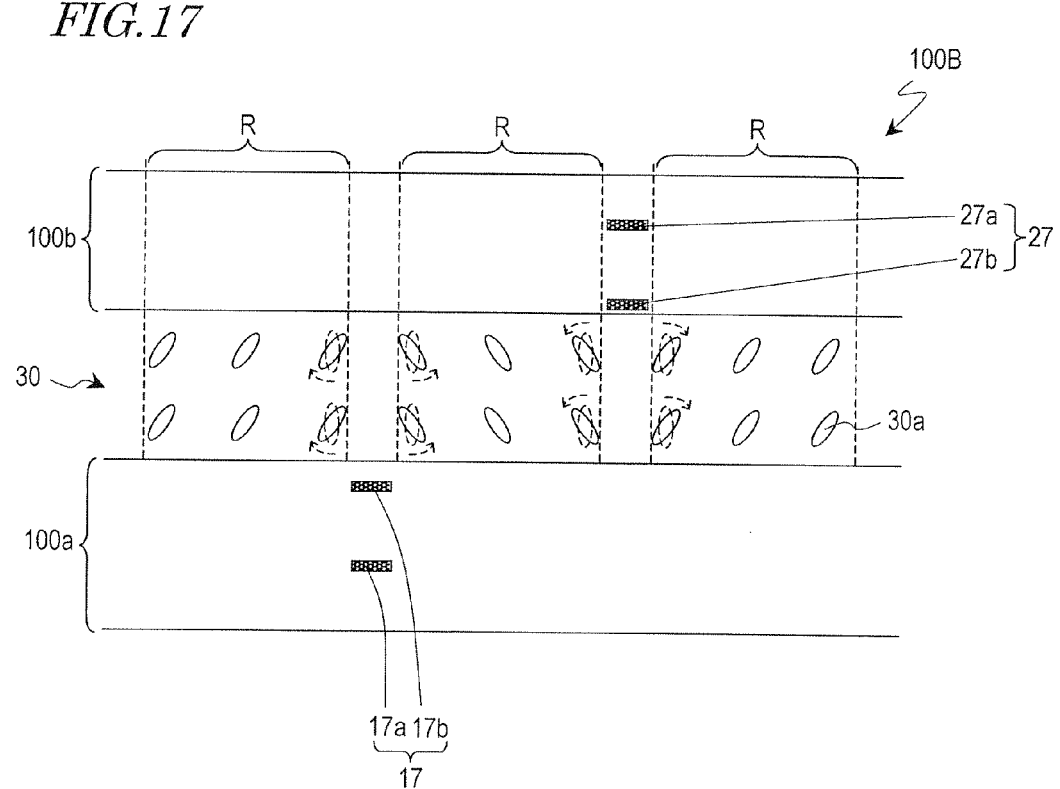
FIG. 17 A cross-sectional view schematically illustrating a liquid crystal display device 100B as still another preferred embodiment of the present invention.

FIG. 17 illustrates a liquid crystal display device 100B as still another preferred embodiment of the present invention. The liquid crystal display device 100B includes not only the opaque portion 17 on the TFT substrate 100a but also the opaque portion 27 on the counter substrate 100b as well.

As can be seen from FIG. 17, when a voltage is applied to the liquid crystal layer 30, the liquid crystal molecules 30a neighboring the boundary over the opaque portion 17 on the TFT substrate 100a (i.e., the boundary on the left hand side of FIG. 17) will tilt while turning one of their end portions, which is located closer to the TFT substrate 100a, away from the boundary. On the other hand, the liquid crystal molecules 30a neighboring the boundary over the opaque portion 27 on the counter substrate 100b (i.e., the boundary on the right hand side of FIG. 17) will tilt while turning one of their end portions, which is located closer to the counter substrate 100b, away from the boundary. Thus, each of these opaque portions 17 and 27 can selectively shield liquid crystal regions R, where the liquid crystal molecules 30a will face away from the viewer, from the incoming light when the viewer is viewing the screen obliquely. Consequently, the display performance in the oblique viewing direction can be closer to the one in the straight viewing direction, thus making the viewer sense much less unnaturalness. On top of that, since both of the opaque portions 17 and 27 of this liquid crystal display device 100B have a multilayer structure, the decrease in optical transmittance in the straight viewing direction can also be minimized.

INDUSTRIAL APPLICABILITY

The present invention is effectively applicable to any multi-domain type liquid crystal display device with a vertical alignment layer in general. Specifically, the liquid crystal display device of the present invention can be used effectively as a display for any of various kinds of electronic devices including cellphones, PDAs, laptops, monitors and TV sets.

The invention claimed is:

1. A liquid crystal display device comprising a first substrate, a second substrate, and a vertical alignment liquid crystal layer interposed between the first and second substrates, the device comprising a number of pixels, each of which includes a first electrode that is arranged on the first substrate to face the liquid crystal layer, a second electrode that is arranged on the second substrate to face the liquid crystal layer, and the liquid crystal layer arranged between the first and second electrodes, and a part of the liquid crystal layer located within each said pixel having multiple liquid crystal regions in which liquid crystal molecules tilt in multiple different directions when a voltage is applied between the first and second electrodes, wherein each said pixel has an opaque portion that is arranged on a boundary between the multiple liquid crystal regions, wherein the opaque portion is provided for at least one of the first and second substrates so that when a voltage is applied between the first and second electrodes, the liquid crystal molecules neighboring the boundary will tilt while turning one of their end portions, which is located closer to the substrate with the opaque portion, away from the boundary, and wherein the opaque portion includes a first shielding layer and a second shielding layer, which overlaps with the first shielding layer with a predetermined gap left between them.

2. The liquid crystal display device of claim 1, further comprising two polarizers that are arranged as crossed Nicols, wherein the direction in which the liquid crystal molecules tilt in each of the multiple liquid crystal regions defines an angle of approximately 45 degrees with respect to the axes of polarization of the two polarizers.

3. The liquid crystal display device of claim 2, wherein the liquid crystal regions include four liquid crystal regions in which the liquid crystal molecules tilt in first, second, third and fourth directions, respectively, and wherein the difference between any two of the first, second, third and fourth directions is substantially equal to an integral multiple of 90 degrees, and wherein in any two adjacent ones of the four liquid crystal regions, the direction in which the liquid crystal molecules tilt in one of the two regions is different by approximately 90 degrees from the direction in which the liquid crystal molecules tilt in the other region.

4. The liquid crystal display device of claim 2, wherein the first electrode has crossed trunk portions, which are arranged so as to overlap with the axes of polarization of the two polarizers, and a number of branch portions, which run from the trunk portion to define an angle of approximately 45 degrees with respect to the trunk portions, and wherein the opaque portion is arranged on the first substrate.

5. The liquid crystal display device of claim 1, further comprising:

two vertical alignment films, which are arranged between the first electrode and the liquid crystal layer and between the second electrode and the liquid crystal layer, respectively; and an alignment sustaining layer, which is made of a photo-polymerizable compound, which covers the respective surfaces of the two vertical alignment films so as to contact with the liquid crystal layer, and which defines the pretilt direction of the liquid crystal molecules of the liquid crystal layer when no voltage is applied to the liquid crystal layer.

6. A liquid crystal display device comprising a first substrate, a second substrate, and a vertical alignment liquid crystal layer interposed between the first and second substrates, the device comprising a number of pixels, each of which includes a first electrode that is arranged on the first substrate to face the liquid crystal layer, a second electrode that is arranged on the second substrate to face the liquid crystal layer, and the liquid crystal layer arranged between the first and second electrodes, and a part of the liquid crystal layer located within each said pixel having multiple liquid crystal regions in which liquid crystal molecules tilt in multiple different directions when a voltage is applied between the first and second electrodes, wherein the liquid crystal regions include a first liquid crystal region in which a retardation value, calculated based on incoming light that has been incident on the liquid crystal layer obliquely with respect to a normal to the display screen, increases as the applied voltage rises, and a second liquid crystal region in which the retardation value once decreases and then increases, and wherein each said pixel has an opaque portion that is provided for at least one of the first and second substrates and that selectively shields the first liquid crystal region from the incoming light when a viewer is viewing obliquely with respect to the normal to the display screen, and wherein the opaque portion includes a first shielding layer and a second shielding layer, which overlaps with the first shielding layer with a predetermined gap left between them.

\* \* \* \* \*